Dec. 17, 1968  J. KOKALY  3,416,561
DUAL PRESSURE RELIEF VALVE WITH SHOCK DAMPING
Filed Dec. 21, 1966  2 Sheets-Sheet 1

INVENTOR.
JOSEPH KOKALY
BY Fryer, Tjensvold, Feix & Phillips
ATTORNEYS

United States Patent Office 3,416,561
Patented Dec. 17, 1968

3,416,561
DUAL PRESSURE RELIEF VALVE
WITH SHOCK DAMPING
Joseph Kokaly, Joliet, Ill., assignor to Caterpillar Tractor Co., Peoria, Ill., a corporation of California
Filed Dec. 21, 1966, Ser. No. 603,518
7 Claims. (Cl. 137—491)

This invention relates to relief valves for use in fluid circuits, and more particularly to a dual pressure relief valve for use in hydraulic circuits wherein different relief pressures are selected automatically for the appropriate circuit.

A common practice, particularly in vehicles used in earth moving operations, is to use a single pump to provide hydraulic pressure for a plurality of circuits, some of which require different operating pressures. In some situations it is desirable to operate opposite ends of a hydraulic jack in the same circuit at different pressures. An example of such a situation is in earth-moving scrapers wherein a double-acting jack is used to lift and lower the scraper bowl. A high pressure is desired when lifting the earth-laden bowl while a much lower pressure is desirable when the bowl is lowered, since jamming the cutting edge of the bowl into the ground can damage it. Obviously separate relief valves can be used in each circuit or on opposite sides of the same circuit to achieve the desired operating pressures for that circuit, or for that side of the circuit. However, use of a plurality of relief valves is economically undesirable, and a single valve which operates at several different relief pressures, depending on the circuit being employed, saves space and reduces complexity.

Relief valves which are capable of relieving at several pressure levels are known. Such a relief valve is described in U.S. Patent No. 3,160,076 issued to Martin. However, the valve disclosed in the Martin patent does not provide for smooth modulation of pressures during valve pressure shifts, or hydraulic shock damping at its highest pressure level, being in the character of an on/off switch between two relief pressures. In such a situation fairly substantial pressure surges and hydraulic hammer in the fluid circuits can develop. Further, these surges, especially during a higher pressure operation are transmitted to the motors in the fluid circuits, which can develop sympathetic surges, adding to the surges developed in the relief valve circuit. A situation can develop where very erratic operation of the hydraulic motors in hydraulic circuits will occur.

U.S. Patent 2,905,190 issued to Oyster discloses a hydraulic shock damping relief valve for a single pressure range which smooths out the pressure surges and hydraulic hammer experienced with valves such as those shown in the Martin patent. However, the Oyster relief valve is for single pressure operation only.

Accordingly, it is a feature of this invention to provide a dual pressure relief valve which incorporates the hydraulic shock damping features of the Oyster device with the dual pressure range of the Martin device.

Another feature of this invention is the provision of a dual pressure relief valve for fluid circuits which provides excellent hydraulic shock damping at the high pressure level to avoid serious pressure surges and hydraulic hammer.

It is another feature of this invention to provide a unique poppet valve which has the ability to reduce the amplitude of pressure fluctuation by modulation of the relief valve in accordance with pressure conditions in the circuit employing such a valve.

In general, the above features and advantages are accomplished in a dual pressure relief valve having pressure modulation at the higher relief pressure which includes a housing having fluid communication with a source of pressure fluid and a port exhausting to reservoir, a valve member movable in said port to open and close the path of pressurized fluid through said port to reservoir, spring biasing means urging said valve member to close off said port, an orifice in said valve member to bleed pressurized fluid through said member to a pressure chamber behind said member to equalize fluid pressures on both sides of said member, a passage from said chamber to reservoir, a spring biased poppet means closing said passage to reservoir, plunger means bearing on said spring biased poppet member to increase its spring bias in response to hydraulic pressure in the circuit, a control passage from said chamber to said plunger means, and a fluid actuated shuttle means located in said control passage for closing off said control passage from said chamber and to dump fluid pressure from said plunger means to relieve any additional bias created by it on said spring biased poppet member.

Many other features and advantages of this invention will be apparent from the following description taken in conjunction with the accompanying drawings, wherein.

Figure 1:
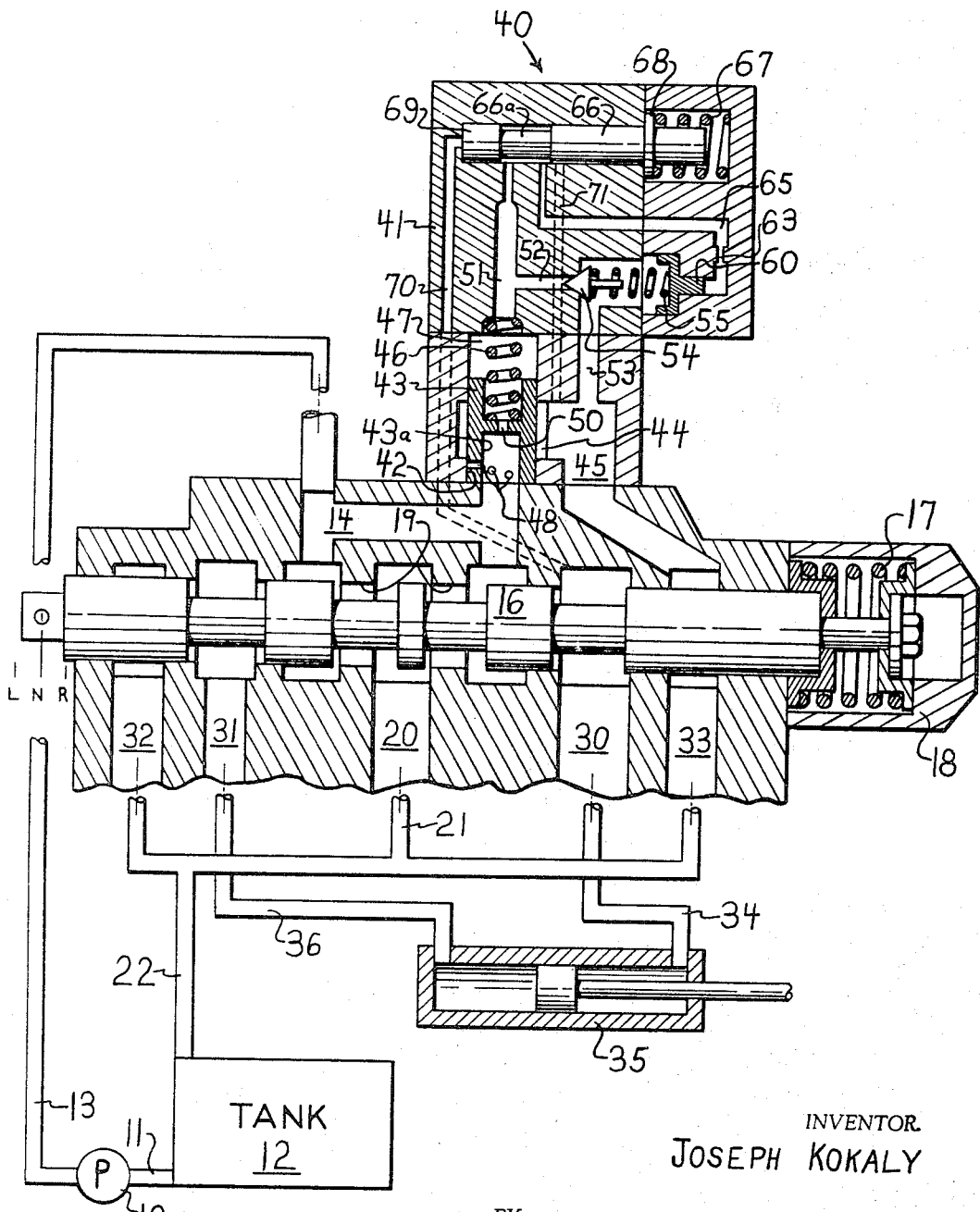
FIG. 1 is a diagrammatic illustration of a typical hydraulic circuit including the dual pressure and shock damping relief valve of this invention and shows the valve in section.

FIG. 1 illustrates a hydraulic circuit schematically which includes a pump 10 connected through line 11 to a reservoir 12. Hydraulic fluid from the pump discharge is through line 13 into the inlet 14 of a control valve body 15. This body has an open center valve spool 16 disposed therein and held in the neutral position (designated by N) by centering spring 17 which cooperates with an end cap structure 18 to hold the spool centered. In the neutral position, hydraulic fluid entering the inlet of the valve body can pass through port 19 and into passage 20 from which it is returned to reservoir via lines 21 and 22 without restriction. Obviously a number of spools could be incorporated in the valve body of the open center type as long as the relief system has fluid communication with the inlet to the valve body ahead of the spools. However, the description of the valve and its operation with reference to one valve spool is adequate for illustrating the present invention, and shows how opposite ends of a common motor circuit can be operated at different pressures with the novel relief valve of this invention.

Until such time as valve spool 16 is moved to the right (indicated by R) or to the left (indicated by L) of the neutral position N, pump 10 operates against little back pressure. However, when the valve spool is moved to R or L, ports 19 will be closed and fluid is channeled into a motor circuit to accomplish work. This movement of the spool connects the inlet 14 of the valve body with either the right motor port 30 or the left motor port 31 while venting the opposite port to reservoir. Motor line 34 connects motor port 30 with one end of motor 35 (illustrated in the drawing as a double-acting jack) and a similar line 36 connects motor port 31 with the opposite end of that motor. With this arrangement, the motor will be operated in opposite directions, depending upon the movement of the valve spool 16; port 32 or 33 drains the non-pressurized side.

When spool 16 is moved to R or L the pressure in the circuit rises sharply since the passage of the fluid output of pump 10 to reservoir is interrupted and the full capacity of the pump is directed to the motor. In order to protect the hydraulic circuit and the motor, it is necessary to relieve the circuit at predetermined pressure ranges which is one of the functions of the novel relief valve of this invention.

For convenience the novel modulating relief valve 40 is shown mounted directly on valve body 15 in FIG. 1 where it provides hydraulic shock damping when highest relief pressure is being used in the fluid circuits located downstream of the relief valve. This dual pressure relief valve includes a valve body 41 having a relief port 42 which communicates with pressure fluid entering the valve body 15 through inlet 14. A sliding dump spool 43 closes the relief port from an exhaust port 44 which leads directly to reservoir 12, via passage 45. The dump spool reciprocates in a balance chamber 47 which contains a spool biasing spring 46 urging the spool out of its chamber to close off the relief port. Thus, the dump spool will open the relief port to the exhaust port if the pressure in the inlet overcomes the pressure of spring 46, provided there is no counterbalancing pressure within the balance chamber.

Dump spool 43 is specially designed with a blind bore 43a extending axially into the dump valve spool. A plurality of radially drilled holes 48 extend from the inside to the outside of the valve spool in the bore and are closed off by a shoulder of port 42 when the spool is in the closed position. These holes are drilled in a spiral fashion in the blind bore so that the holes will serially come into communication with port 44 as the spool opens. Through this design, flutter of the dump spool is avoided since, as the spool begins to close across the shoulder of port 42, there is still flow through some of the radial holes until it reaches a fully closed position. When the valve is used primarily in bypass applications holes 48 may be modified to a circumferential pattern. Actually, these arrangements can allow the dump spool to "float" at some intermediate position by exposing a sufficient number of holes to hold a certain pressure range without the necessity of the spool fluttering between the open and closed positions, which is very detrimental to the service life of the dump spool.

As is typical in pilot operated dump valves the novel dual pressure relief valve of this invention includes a small orifice 50 through the dump spool which admits fluid into the balance chamber 47. Passage 51 in communication with the balance chamber exhausts to reservoir via a secondary passage 52 and drain 53 but is normally closed by poppet valve 54. The poppet is biased by a spring 55 and will remain closed until the pressure in the balance chamber exceeds the spring bias. Thus, with this arrangement orifice 50 allows a differential pressure to develop across the dump spool when the poppet valve is opened by pressure in the balance chamber. This differential pressure develops because fluid is vented by the poppet to drain at a rate faster than it can enter the balance chamber via orifice 50.

By abutting one end of spring 55 on a fluid actuated plunger 60 and providing a fluid communication path from chamber 47 to the opposite side of the fluid actuated plunger, it is possible to change the spring bias on the poppet in proportion to the pressure conditions on the circuit which are reflected through orifice 50 in the dump spool 43. The fluid pressure communicated to chamber 47 through orifice 50 is further restricted in communication with plunger 60 by an orifice 63 to delay reaction of the plunger relative to movement of poppet 54 under conditions of very high pressure rise rates.

Figure 2:
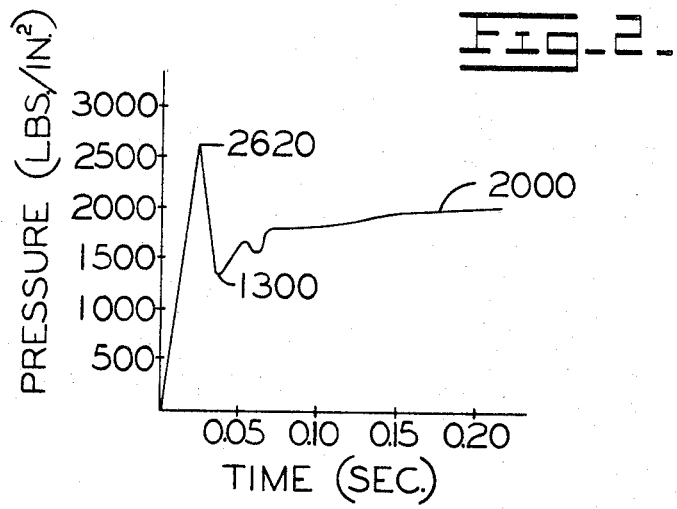
FIG. 2 is a pressure versus time graph of a characteristic curve produced by the valve of this invention showing its shock damping characteristics.
Figure 3:
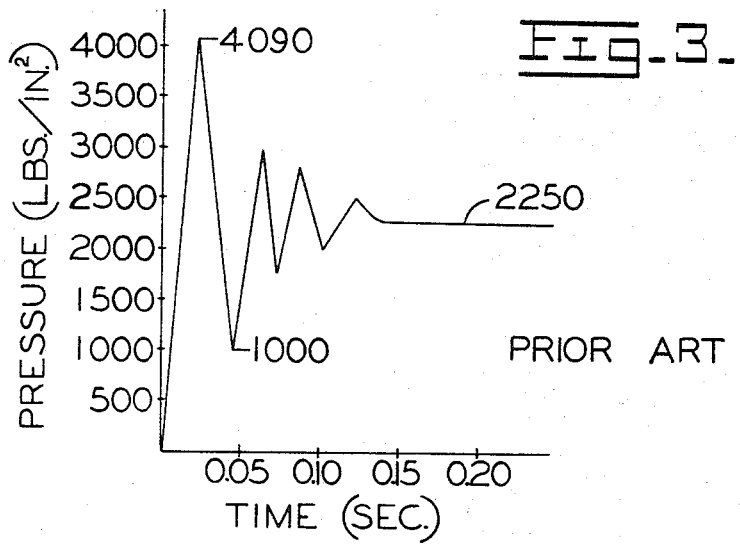
FIG. 3 is a similar pressure time graph characteristic of non-damped relief valves.

The dual pressure relief valve of this invention is able to provide excellent modulation along with the accommodation of several relief pressures. Modulation in the high pressure relief range is illustrated by FIG. 2. In that figure, a graph displays the increase from zero pressure to maximum pressure against time. It can be seen that when the spool 16 directs pump output to a high pressure circuit, the pressure climbs to an overshoot condition of 2620, dropping quickly to 1,300 p.s.i. and then immediately levels at the desired pressure of 2,000 p.s.i. Referring to FIG. 3 showing a similar device not using the hydraulic shock damping feature, but the same equipment, the pressure peak immediately after moving valve spool 16 was 4,090, dropping then to 1,000 and fluctuating sharply until finally leveling at 2,250. Utilizing the hydraulic shock damping feature, the more preferred pressure stabilization shown in FIG. 2 is obtained. Obviously, the elimination of high pressure overshoots and quick pressure stabilization is desirable in hydraulic circuits and decreases repair and maintenance costs, especially in higher pressure circuits.

In the above-described operation, the high pressure operation with hydraulic shock damping of the relief valve was described, and in order to achieve a dual pressure range the bias of plunger 60 must be reduced to its lowest bias so that the poppet 54 will relieve chamber 47 at a lower pressure. To accomplished this in the instant invention, the passage from chamber 47 to the pressure side of the plunger is formed by a passage 51 leading to a bore 64 which communicates with another passage 65 with a small orifice 63 leading therefrom to the fluid pressure side of the plunger 60. Bore 64 is provided with a shuttle valve 66 which has a reduced section 66a, and is retained in a position which will open a flow channel between passage 51 and passage 65 by a load spring 67 which bears on a flanged end 68 of the shuttle valve. The opposite end 69 of the shuttle valve is exposed to fluid pressure in relief pressure control passage 70, which in this case leads to motor port 30 so that that side of hydraulic motor 35 can be actuated at a lower pressure than its opposite side, actuated by motor port 31.

When the valve spool 16 is moved to the L position, which opens the inlet of the valve body to motor port 30, fluid pressure in that motor port acting through relief pressure control passage 70 moves the shuttle valve 66 into spring 67 closing off passage 51 from the bore 64. Further, as the shuttle spool moves in the direction of the spring it opens a drain passage 71 to the reservoir so that fluid pressure holding the load plunger 60 in a spring-compressed position can bleed from behind the plunger via orifice 63 to allow a reduction of the bias on spring 55, and thereby lower the pressure at which poppet valve 54 allows pressure relief to be accomplished.

This novel and compact dual pressure relief valve with hydraulic shock damping at its highest relief pressure provides an excellent relief valve for many implement circuits and greatly reduces repair and maintenance costs in earth-moving equipment. It is far superior to the prior types of dual pressure relief valves.

What is claimed is:

1. A dual pressure relief valve having pressure modulation for use in hydraulic circuits with dual relief pressure requirements comprising:
   a valve body having a port therein which drains to reservoir, said port being in fluid communication with a source of pressure fluid;
   a dump spool reciprocally mounted in a balance chamber in said valve body and operable to close such port to prevent fluid flow therethrough from said source of pressure fluid to reservoir, said dump spool having an orifice therethrough whereby pressure fluid may enter such balance chamber to counterbalance fluid pressures on said dump spool from said source of pressure fluid;
   a biasing means located in such balance chamber operable to directionally urge said dump spool to close such port;
   a drain to reservoir located in such balance chamber;
   a spring biased poppet means closing said drain until pressure in such balance chamber exceeds the bias;
   a pressure responsive member in contact with the spring bias operable to increase such bias when subject to pressure fluid;

a passage from such balance chamber to said pressure responsive member whereby pressures in such balance chamber are reflected as spring bias on said spring biased poppet means; and shuttle valve means located in said valve body operable to close off said passage and dump fluid pressure reflected to said pressure responsive member through said passage to reservoir causing said relief pressure of the valve to be reduced.

2. The dual pressure relief valve as defined in claim 1 wherein the shuttle valve means includes a fluid motor having fluid communication with circuits operating at the lower pressure in the circuit which will cause said shuttle valve means to close the passage when these circuits are operated thereby giving a lower relief pressure in the circuit.

3. The dual pressure relief valve as defined in claim 1 wherein the passage from the balance chamber to the fluid responsive member includes an orifice which restricts the fluid flow to and from said fluid responsive member thereby providing damping of the dump spool by controlling the rate of pressure change on said fluid responsive member.

4. The dual pressure relief valve as defined in claim 1 wherein the port in which the dump spool is received includes a shoulder and said dump spool includes a plurality of radial holes which open to reservoir when said spool is in transit to its open position and which are closed to said shoulder when said spool is in its closed position.

5. The dual pressure relief valve as defined in claim 4 wherein the port in which the dump spool is received includes a shoulder and said dump spool includes a plurality of radial openings that serially open such port to reservoir as said spool moves to the open position thereby establishing a gradually increasing flow to reservoir through said port once said dump spool unseats and moves towards an open position.

6. The dual pressure relief valve as defined in claim 1 wherein the passage from the balance chamber to the pressure responsive member includes a restrictive orifice to reduce fluctuations in relief pressure.

7. The dual pressure relief valve defined in claim 2 wherein the fluid motor is a pressure actuated plunger with a spring return means.

References Cited

UNITED STATES PATENTS 3,023,584    3/1962    Markovich _____ 137—596.13 X

WILLIAM F. O'DEA, *Primary Examiner.*

HOWARD M. COHN, *Assistant Examiner.*

U.S. Cl. X.R.

91—451; 137—596.13

UNITED STATES PATENT OFFICE
CERTIFICATE OF CORRECTION

Patent No. 3,416,561                           December 17, 1968

Joseph Kokaly

It is certified that error appears in the above identified patent and that said Letters Patent are hereby corrected as shown below:

Column 6, line 1, "to" should read -- by --.

Signed and sealed this 17th day of March 1970.

(SEAL)
Attest:

Edward M. Fletcher, Jr.

Attesting Officer

WILLIAM E. SCHUYLER, JR.

Commissioner of Patents